US005388683A

United States Patent [19]

Norton

[11] Patent Number: 5,388,683

[45] Date of Patent: Feb. 14, 1995

[54] DECORATING HOLLOW CONTAINERS

[75] Inventor: Michael D. Norton, Walbridge, Ohio

[73] Assignee: Owens-Illinois Plastic Products Inc., Toledo, Ohio

[21] Appl. No.: 92,347

[22] Filed: Jul. 16, 1993

[51] Int. Cl.[6] .................... B65G 47/24

[52] U.S. Cl. .................... 198/379; 101/38.1; 414/783

[58] Field of Search .................... 198/377, 379, 470.1; 101/36, 38.1; 414/781, 783

[56] References Cited

U.S. PATENT DOCUMENTS

| | | | |
|---|---|---|---|
| 2,249,939 | 7/1941 | Branan | 101/38.1 |
| 2,857,038 | 10/1958 | Nobel et al. | 198/379 |
| 3,172,359 | 3/1965 | Rudolph et al. | 101/38.1 X |
| 3,232,225 | 2/1966 | Berthold et al. | 198/379 X |
| 3,309,256 | 3/1967 | Warsager | 101/38.1 X |
| 3,944,058 | 3/1976 | Strauss | 198/377 |
| 4,392,565 | 7/1983 | Strauch | 198/378 |
| 4,640,406 | 2/1987 | Willison | 198/379 X |

*Primary Examiner*—James R. Bidwell

[57] ABSTRACT

For use in an apparatus wherein a container is supported for decorating, wherein the container has a neck and a finish with an opening formed at an angle to the axis of the container, a chuck for engaging the finish. The chuck includes a body having an axis of rotation. The body includes an annular axially facing surface having the same axis as the axis of the body. The annular surface is frustoconical and forms an angle with the axis of the body such that the finish is engaged by the surface for holding the end of the container with the neck and finish in position for decoration. The body is mounted for rotation about its axis.

8 Claims, 2 Drawing Sheets

S
27
28
29
26
13a
25
20
13
21
23
22
2
18
19
17
11
10
15
3
16
12

DECORATING HOLLOW CONTAINERS

This invention relates to decorating hollow containers such as by printing or labeling.

BACKGROUND AND SUMMARY OF THE INVENTION

In decorating hollow containers, it is common to engage the container that has a base, a hollow body and a neck with a finish and an opening and move or rotate the container for decoration such as printing or labeling. Typical apparatus is shown in U.S. Pat. Nos. 3,311,051, 3,944,058, 4,398,627, 4,848,227 and 5,137,136.

In such apparatus, the base and neck are engaged to permit the decoration of the body of the container. However, where the container has a neck and a finish that is at an angle to the axis of the container such a container must be handled in some other manner.

Among the objectives of the present invention are to provide a chuck for such a container which is readily made; which does not require orientation with respect to the bottle; and which permits the container to be delivered in an unoriented fashion with respect to the chuck; and wherein the chuck can be readily adapted to use in different decorating apparatus.

In accordance with the invention, an apparatus is provided wherein a container is supported for decorating, wherein the container has a neck and a finish with an opening formed at an angle to the axis of the container. The apparatus includes a chuck for engaging the finish that includes a body having an axis of rotation. The body includes an annular axially facing surface having the same axis as the axis of the body. The annular surface is frustoconical and forms an angle with the axis of the body such that the finish is engaged by the surface for holding the end of the container with the neck and finish in position for decoration. The body is mounted for rotation about its axis.

DESCRIPTION

Figures 1, 2, 3:
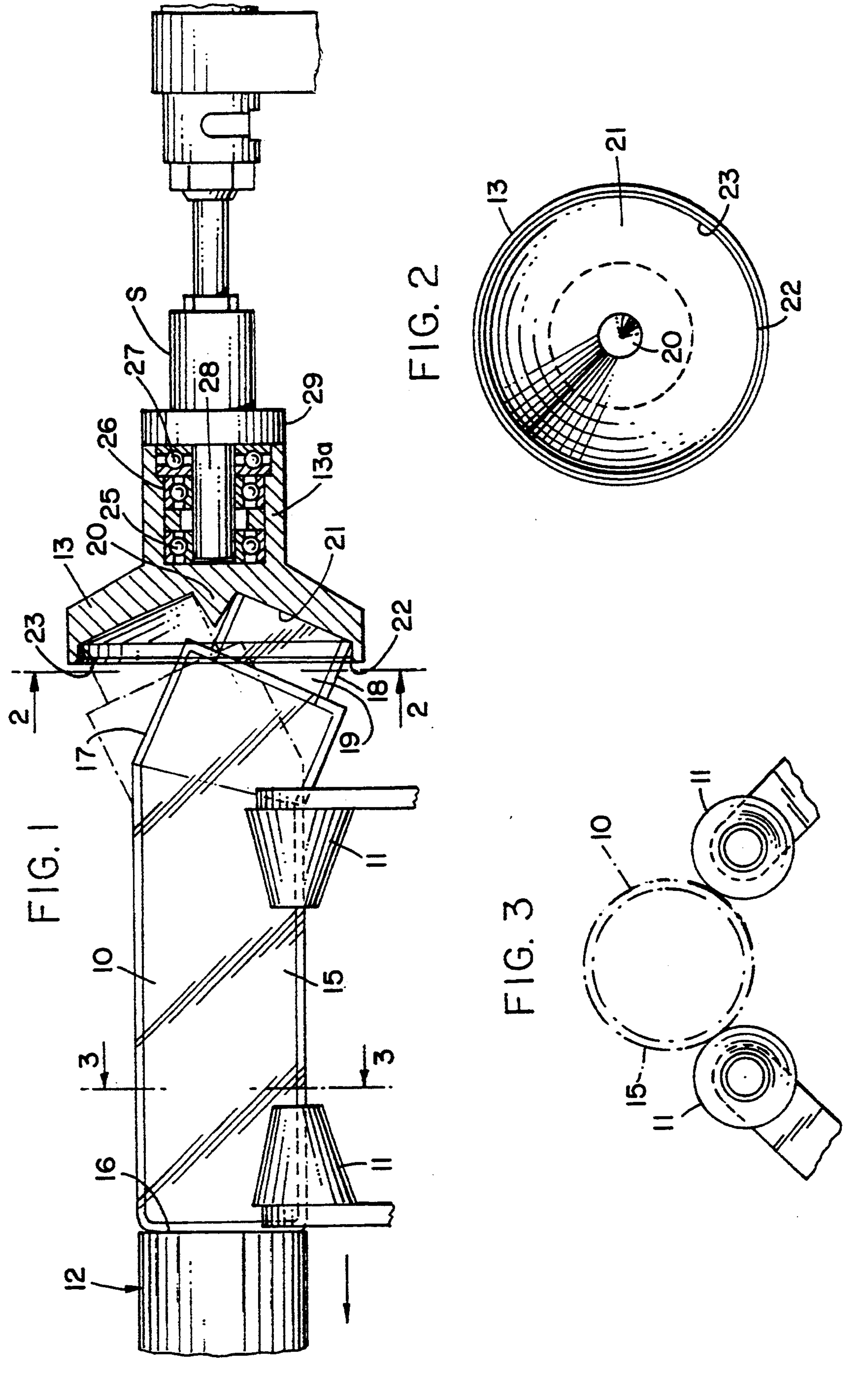
FIG. 1 is a part sectional view of an apparatus embodying the invention.
FIG. 2 is a view taken along the line 2—2 with the container out of position.
FIG. 3 is a sectional view of the chuck on an enlarged scale.

Referring to FIGS. 1–3, the container 10 includes a body 15, a base 16 and a neck 17 at an angle to the axis of the body 15 and a finish 18 having an opening 19 at the same axis as the neck 17.

In accordance with the invention, a chuck 13 is made of metal and includes a body 13*a* having an axially extending center conical portion 20 which has an axis coincident with the axis of the body. The conical portion 20 is surrounded by an annular frustoconical surface 21 having the same axis as the body of chuck 13. The width of the surface 21 is preferably such as to accommodate finishes 18 of various diameters. The chuck 13 further includes an annular outwardly tapered guide surface 22 extending from an axial peripheral wall 23. Chuck 13 is mounted on a shaft 28 by radial bearings 25, 26 and thrust bearing 27 and has a radial flange 29.

In the form shown in the drawings, the shaft 28 is formed with an integral flange 29. The shaft can be formed with threads that extend into a support S. Alternatively, the flange 29 and support S are made larger and screws are used to mount the shaft 28 on a support S.

Figure 4:
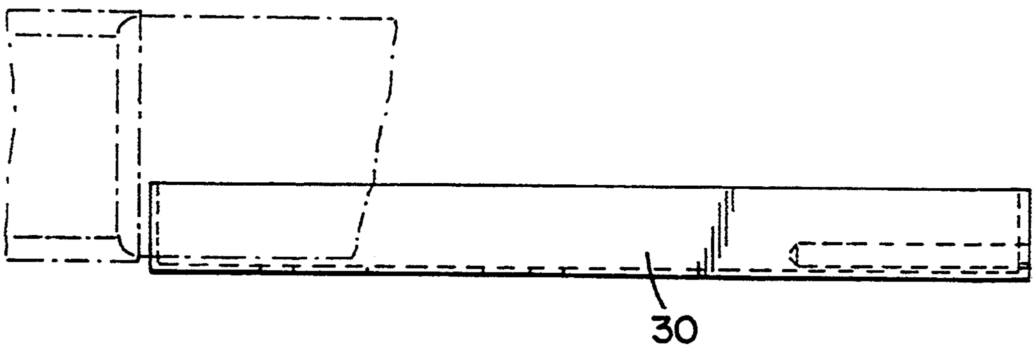
FIG. 4 is a side view of a modified form of cradle for a container.
Figure 5:
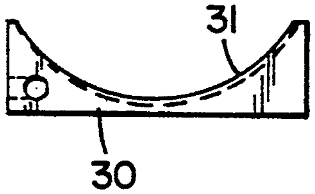
FIG. 5 is an end view of the same.

The remainder of the apparatus may be like the apparatus shown in U.S. Pat. Nos. 3,311,051, 3,944,508, 4,398,627, 4,848,227 and 5,137,136 incorporated herein by reference. Such apparatus includes means for moving a container to decorating stations for engagement with chuck 13. In some of such apparatus a cradle is provided for holding a container horizontally, as by the rollers 11. In others, cradles are provided such as shown in FIGS. 4 and 5. Each cradle 30 consists of a body attached to a conveyor and having an upwardly facing cavity 31 for receiving a container. The cavity 31 has a configuration shaped to receive the conveyor.

In use, a container 10 is brought into position by the cradle formed by rollers 11 of an indexing conveyor and a base chuck 12 is moved axially to bring the finish of the container into contact with the annular surface 21 of chuck 13 thereby aligning and holding the container in position for handling including rotation, if necessary for completing the decorating.

It can thus be seen that there has been provided a chuck for such a container which is readily made; which does not require orientation with respect to the bottle; and which permits the container to be delivered in an unoriented fashion with respect to the chuck; and wherein the chuck can be readily adapted to use in different decorating apparatus.

I claim:

1. For use in an apparatus wherein a container is supported for decorating, wherein the container has a finish with an opening wherein the finish and the opening have the same axis which is at an angle to the axis of the container, said finish having an outer end surrounding said opening, a chuck for engaging the finish, said chuck having a body having an axis, said body having an inwardly facing annular frustoconical surface having the same axis as the body of said chuck, said frustoconical surface being at an angle to the axis of the body of said chuck such that the entire outer end of said finish engages the frustoconical surface for holding the container in position and such that the axis of the frustoconical surface, the axis of the body of the chuck and the axis of the container are aligned and such that the container need not be oriented circumferentially with respect to the frustoconical surface.

2. The chuck set forth in claim 1 wherein said body has an axially extending conical center portion which includes an outwardly facing annular surface at the center of the chuck, said center portion having the same axis as said chuck extending toward the finish for engaging and guiding the finish into engagement with said frustoconical surface.

3. The chuck set forth in claim 1 including means for rotatably mounting said chuck about its axis.

4. The chuck set forth in any one of claims 1–3 including means for moving and holding a container adjacent said chuck for engagement by said chuck.

5. The chuck set forth in claim 4 including a base chuck aligned with said chuck for engaging the base of a container.

6. In a method wherein a container is supported for decorating and wherein the container has a finish with an opening wherein the finish and the opening have the same axis at an angle to the axis of the container, said finish having an outer end surrounding said opening, the method of engaging the container, providing a chuck for engaging the finish comprising a body having an axis, providing an inwardly facing annular frustoconical surface on said body having the same axis as said body, positioning said frustoconical surface such that it is at an angle to the axis of the body and the finish, engaging the entire end of said finish with the frustoconical surface for holding the container in position such that the axis of the frustoconical surface, the axis of the body of the chuck and the axis of the container are aligned.

7. The method set forth in claim 6 including providing a conical center portion defining another outwardly facing annular surface at the center of the chuck extending toward the finish for engaging and guiding the finish into engagement with said first mentioned frustoconical surface.

8. The method set forth in claim 7 including the steps of positioning a container with the axis of the container aligned with the axis of said chuck for engagement with said chuck, providing a base chuck, moving a base chuck aligned with said chuck into engagement with the base of a container to engage the entire outer end of the finish of the container with the frustoconical surface, and rotating the container while it is engaged by the chuck and the base chuck.

* * * * *